(12) United States Patent
Vedula et al.

(10) Patent No.: US 8,332,918 B2
(45) Date of Patent: Dec. 11, 2012

(54) TECHNIQUES FOR REAL-TIME ADAPTIVE PASSWORD POLICIES

(75) Inventors: Srinivas Vedula, Orem, UT (US); Cameron Craig Morris, Saratoga Springs, UT (US); Larry Hal Henderson, Orem, UT (US)

(73) Assignee: Novell, Inc., Provo, UT (US)

( * ) Notice: Subject to any disclaimer, the term of this patent is extended or adjusted under 35 U.S.C. 154(b) by 814 days.

(21) Appl. No.: 11/951,524

(22) Filed: Dec. 6, 2007

(65) Prior Publication Data
US 2009/0150677 A1 Jun. 11, 2009

(51) Int. Cl.
H04L 29/06 (2006.01)
(52) U.S. Cl. .............. 726/6; 726/1; 726/7; 713/182
(58) Field of Classification Search .............. 713/182, 713/183, 184; 726/1, 5, 6, 7, 18, 19, 21
See application file for complete search history.

(56) References Cited

U.S. PATENT DOCUMENTS

| | | | |
|---|---|---|---|
| 5,204,966 A * | 4/1993 | Wittenberg et al. ............. 726/6 |
| 7,165,182 B2 | 1/2007 | Excoffier et al. | |
| 7,260,838 B2 | 8/2007 | Bones et al. | |
| 7,290,275 B2 * | 10/2007 | Baudoin et al. .............. 726/1 |
| 7,523,318 B2 * | 4/2009 | Goal et al. ............. 713/184 |
| 7,581,245 B2 * | 8/2009 | Rojewski ............. 726/6 |
| 7,849,320 B2 * | 12/2010 | Raikar et al. .............. 713/182 |
| 7,934,101 B2 * | 4/2011 | Stieglitz et al. ............. 713/183 |
| 2004/0250141 A1 | 12/2004 | Casco-Arias et al. | |
| 2005/0102534 A1 * | 5/2005 | Wong ............. 713/201 |
| 2005/0114673 A1 * | 5/2005 | Raikar et al. .............. 713/182 |
| 2005/0235341 A1 * | 10/2005 | Stieglitz et al. ............. 726/5 |
| 2005/0273625 A1 * | 12/2005 | Dayan et al. ............. 713/184 |
| 2006/0259960 A1 | 11/2006 | Kondo | |
| 2007/0006301 A1 * | 1/2007 | Nickell et al. ............. 726/22 |
| 2007/0016804 A1 | 1/2007 | Kemshall | |
| 2007/0143626 A1 * | 6/2007 | Okuda ............. 713/183 |
| 2007/0150934 A1 * | 6/2007 | Fiszman et al. ............. 726/1 |

FOREIGN PATENT DOCUMENTS
WO WO-2007081519 A2 7/2007

OTHER PUBLICATIONS

Villarrubia, Carlos; Fernandez-Medina, Eduardo; Piattini, Mario; "Quality of Password Management Policy", The First International Conference on Availability, Reliability and Security, Apr. 20-22, 2006, 7 pgs.*

Hamilton, Stephen S.; Carlisle, Martin C.; Hamilton Jr., John A.; "A Global Look At Authentication", Information Assurance and Security Workshop, Jun. 20-22, 2007, 8 pgs.*

* cited by examiner

*Primary Examiner* — Carl Colin
*Assistant Examiner* — Victor Lesniewski
(74) *Attorney, Agent, or Firm* — Schwegman, Lundberg & Woessner, P.A.

(57) ABSTRACT

Techniques real-time adaptive password policies are presented. Patterns for passwords are regularly analyzed along with other factors associated with the patterns to dynamically determine password strength values. The strength values can change over time based on usage statistics. When a strength value falls below an acceptable threshold, passwords associated with that particular pattern can be downgraded or rejected in real-time and existing policy can be adapted to reflect the undesirability of that pattern.

24 Claims, 3 Drawing Sheets

US 8,332,918 B2

TECHNIQUES FOR REAL-TIME ADAPTIVE PASSWORD POLICIES

BACKGROUND

Current implementations of password policies are static and restricted in scope by details that are manually defined by network administrators. These policies generally only check the probabilistic quality of the passwords that they are designed to address. However, the ability to select weak password formats still exists. In essence because of dynamically changing conditions within an enterprise, the administrators are left guessing as to which policies are secure enough for the enterprise and which other policies should be abandoned.

Moreover, typical password policy implementations only store a user's previous few passwords (usually the last two passwords) to make sure the user does not reuse them. This is not secure as a user can usually get around this limitation fairly easy to set the password to something the user likes. Moreover, in this scenario after three passwords, the user can revert back to an old password for reuse.

Password policy is usually something that an administrator plans and manually defines for an enterprise. Support for the password policy is manually adjusted on an as-needed basis by the administrator. This manual and ad-hoc approach does not account for the ever changing and chaotic environments associated with today's enterprises. This is especially problematic when intruders are constantly finding new ways to penetrate an enterprise's secure environment and damage or steal enterprise assets.

Thus, what is needed is a mechanism, which allows for improved password policy enforcement.

SUMMARY

In various embodiments, techniques for real-time adaptive password policies are provided. More specifically, and in an embodiment, a method is presented for adapting a password policy in real time. A first password policy is enforced against users of a network service. Next, password patterns being used by the users are dynamically evaluated and a second password policy is adaptive in real time and in response to the evaluation of the password patterns and the second password policy is enforced in place of the first password policy against the users.

DETAILED DESCRIPTION

Various embodiments of this invention can be implemented in existing network architectures, security systems, data centers, and/or communication devices. For example, in some embodiments, the techniques presented herein are implemented in whole or in part in the Novell® proxy server products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 1:
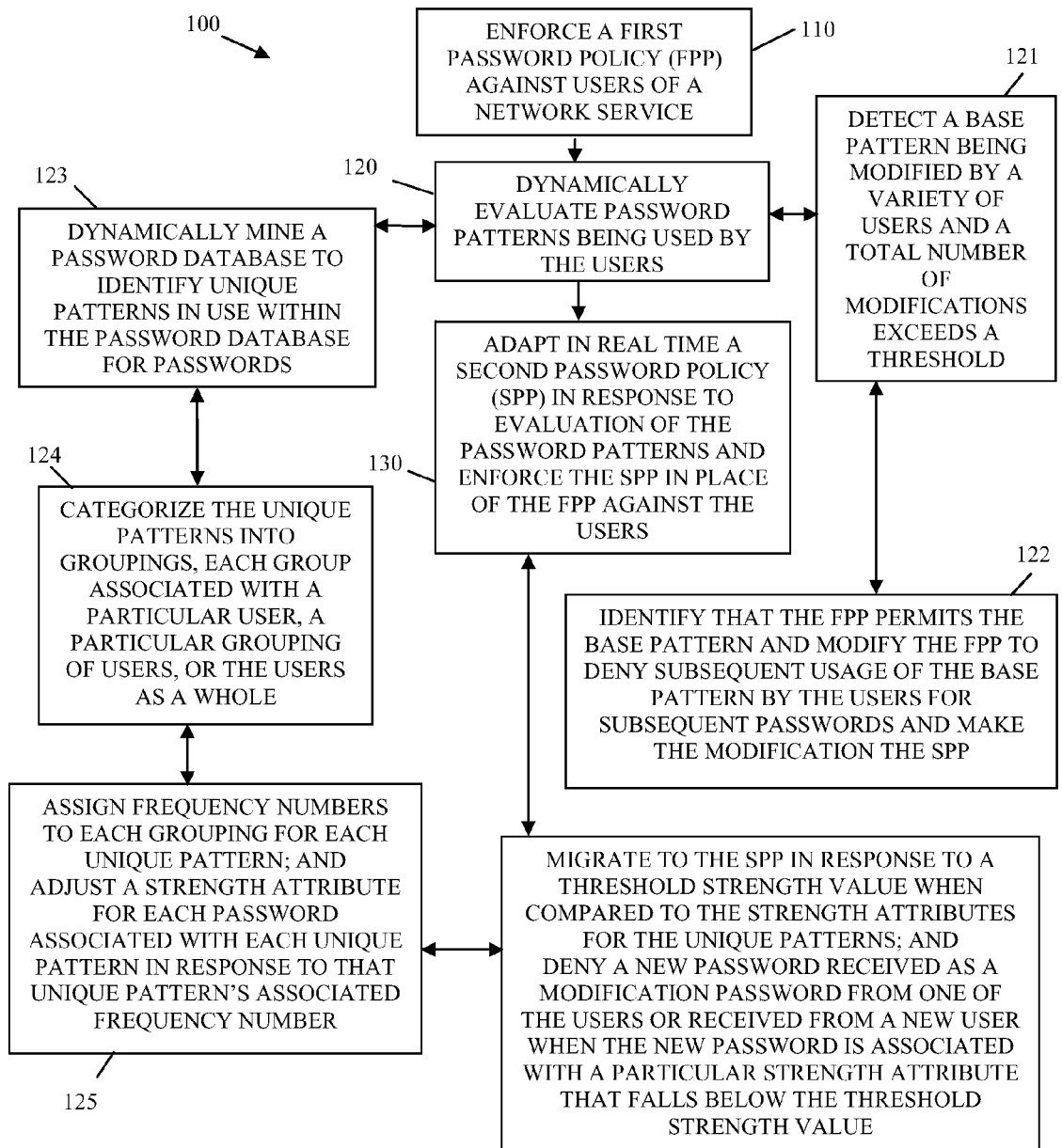
FIG. 1 is a diagram of a method for adapting a password policy in real time, according to an example embodiment.

FIG. 1 is a diagram of a method 100 for adapting a password policy in real time, according to an example embodiment. The method 100 (hereinafter "password service") is implemented as instructions in a machine-accessible and readable medium. The instructions when executed by a machine perform the processing depicted in FIG. 1. The password service is also operational over and processes within a network. The network may be wired, wireless, or a combination of wired and wireless.

Initially, the password service is implemented as a front end to or within an enterprise secure network. The secure network includes access to one or more services that a user desires to access and use. The user gains access to the secure network by logging in and authenticating to the secure network using an identifier and a password combination. This permits the user to be authenticated and a proper identity along with an appropriate security access level to be assigned to the user for access to the resources/services of the secure network.

The password service is invoked and processed when new user accounts are created within the secure network environment or when existing users are prompted to change or modify an existing password, such as is the case when a password expires after some period of time during which it is successfully used or such as when a user manually requests that a password be reset or re-established.

So, the password service may be integrated into an enterprise's authentication service or may compliment that authentication service as a supplemental service that is just invoked when new passwords are being established.

It is within this initial context that the processing of the password service is now described with reference to the FIG. 1.

At 110, the password service enforces a first password policy against users of a network service (associated with an enterprise's secure network). The first password policy may require that passwords conform to certain restrictions, such as and by way of example only, eight or more characters having at least one upper case character and at least one numeric character (e.g., "Srinivas9").

By enforcement it is meant that when users enter an initial or replacement password, the password service is invoked and determines if the supplied password conforms to the dictates of the first password policy. Anything not conforming to the first password policy is rejected, such that an error message is presented to the user indicating that the supplied password does not conform to the first password policy and requesting that the user retry with a different password.

At 120, the password service dynamically evaluates password patterns being used by the users. This means that the password service regularly at predefined periods of time (configurable intervals) or in response to an event (new password being supplied) checks for password patterns and analyzes these patterns in a variety of manners for purposes of dynamically adapting or changing the first password policy to a second password policy (discussed below). Some example ways in which the password service analyzes the password patterns follow.

It is noted that the actual password text used by any particular user need not be retained in a password database for the analysis that follows; rather, a regular expression that defines a pattern used by a particular user can be stored and retained in the password database. This permits analysis of passwords without actually retaining or knowing the actual content of a particular password.

For example, in the prior example instead of storing "Srinivas9" in the password database the following can be stored "A[1]a[7]D[1]" where "A" stands for an uppercase character; "a" stands for a lower case character; and "D" stands for a numeric character digit. The square brackets "[ ]" that follow each letter identifies a length, so there is one uppercase character, seven lower case characters, and one digit character in the example. The point is that any formal regular expression can be used to define the pattern for a password, such that the pattern is retained without actually retaining the password itself.

According to an embodiment, at 121, the password service detects a base pattern being modified by a variety of users and a total number of modifications made to that base pattern. The total number of modifications exceeds a given predefined threshold. In such a case, at 122, it may be that the password service identifies the base pattern as being permissible according to the tenets of the first password policy but the total number of modifications now exceed the threshold indicating that the password service is to modify the first password policy to no longer permit subsequent usage of the base pattern by users submitting subsequent passwords. The modified first password policy then becomes the second password policy (discussed below). In this manner, once a base pattern for a particular password has been decorated for a threshold amount of iterations, the password service adapts the first password policy to dynamically create a second password policy that subsequently denies usage of the base pattern. This ensures that excessive usage of any particular pattern is not taken place within the password database and ensures added security. This also takes place in a dynamic and automated fashion without the need for any administrative intervention or analysis. Thus, the password policy is adaptive and dynamic and not static, which is the case with traditional password policy approaches.

In another case, at 123, the password service can dynamically mine a password database to identify unique password patterns in use within an enterprise's secure network. The password patterns are stored in a password database; but again the actual content of any particular password need not be stored or retained in the password database.

In yet another case, at 124, the password service categorizes the unique patterns into groupings. Each group associated with a particular user, a particular grouping or users, or the users as a whole across the entire enterprise. So, a unique pattern can include a plurality of users assigned to a same group, or an individual user, or even the enterprise as a whole (a single generic pattern covering all users).

In a situation, at 125, the password service assigns frequency numbers to each grouping for each unique pattern. The frequency numbers identify the number of times that a particular pattern has been decorated or used by a particular user or particular grouping of users. The greater the frequency number the lower an assigned strength attribute that is associated to a particular password pattern. Conversely, the lower the frequency number the higher the assigned strength attribute that is associated with a particular password pattern.

The strength attribute is an indication as to whether a particular password pattern is more favorable or less favorable within the enterprises secure network for access to its resources and assets. So, the higher value assigned to the strength attribute the more secure and desirable the password pattern associated with that strength attribute. Essentially, the password service mines the password database for unique password patterns and determines the frequency with which each pattern is in use within the enterprise and then uses this to assign a strength attribute value.

At 126, the password service can use the strength attribute values to migrate from the first password policy to a new second password policy. This is done by comparing a threshold strength value against the strength attributes for the unique patterns. Any new or modified password received from a new or existing user and having a strength attribute that falls below the threshold strength value is denied. So, what may have been previously permissible under the first and initial password policy may become unacceptable as time progresses and as passwords are continually added to the password database and managed by the password service. When this occurs the first password policy is adjusted or dynamically adapted to be a second password policy that accounts for the new situation in a dynamic and real-time fashion or manner.

So, at 130, the password service essentially adapts in real time to a second password policy in response to evaluation of the password patterns. The first password policy is dynamically changed to become the new second password policy. In this manner, the password service adapts to a new environment and new circumstances in an automated, real-time, and dynamic fashion and transitions to the second password policy without any administrator intervention or action. The second password policy is then enforced against the users and it too will eventually become obsolete and an adaption will occur to yet another third password policy. Essentially, based on pattern usages the password service learns and adjusts to change and alter password policy in a dynamic and real-time fashion.

Figure 2:
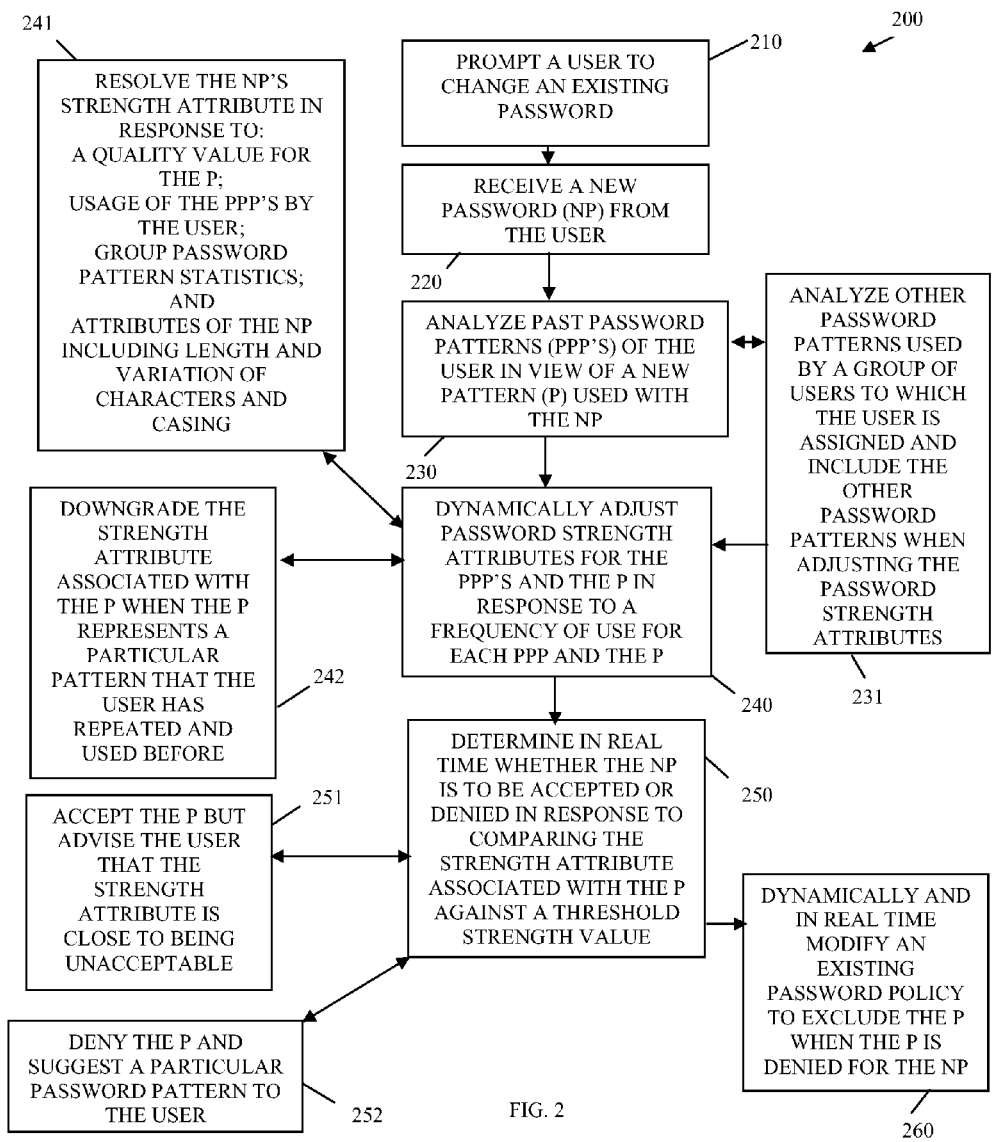
FIG. 2 is a diagram of a method for determining whether a user-supplied password is acceptable in view of the user's password history, according to an example embodiment.

FIG. 2 is a diagram of a method for determining whether a user-supplied password is acceptable in view of the user's password history, according to an example embodiment. The method 200 (hereinafter "password pattern service" is implemented in a machine-accessible and readable medium as instructions. The instructions when executed by a machine perform the processing depicted in the FIG. 2. Moreover, the password pattern service is operational over a network, and the network may be wired, wireless, or a combination of wired and wireless.

The processing associated with the password pattern service represents an enhanced and in some cases more detailed perspective of the password service represented by the method 100 and described within the context of the FIG. 1.

In particular, the password pattern service is presented from the perspective of managing a particular user's passwords for an enterprise secure network. It is noted that the password pattern service can be used to manage all the users of the secure network, but the description that follows is presented for purposes of comprehension from the perspective of managing a single user's passwords within the secure network.

At 210, the password pattern service prompts a user to change an existing password. This can occur for a variety of reasons. For example, the password may include an expiration attribute that indicates the time has come for the user to change the existing password to a new password. In another case, the user or an administrator may change policy or manual force the user to change the existing password; this could occur when the user or administrator feels a breach of the existing password has occurred or is likely to occur.

At 220, the password pattern service receives a new password from the user in response to being prompted by the password pattern service to change the existing password.

At 230, the password pattern service analyzes past password patterns of the user in view of a new pattern detected with the new password entered and supplied by the user at 220. The analysis may entail detecting how many unique patterns the user has had and how many times each one was modified or decorated by the user to achieve a new password.

According to an embodiment, at 231, the password pattern service can also analyze other password patterns by a group of users to which the user is assigned or associated. These other password patterns can be included and used when adjusting password strength attributes that are to be assigned to the user's new password (discussed below with reference to the processing at 240).

At 240, the password pattern service dynamically adjusts existing password strength attribute values for the past password patterns previously used by the user and also adjust the strength attribute value being assigned to the new password that the user offered. This can be done in response to a variety of factors. One factor used is a frequency of use associated with each pattern being examined or analyzed.

Some other factors that influence the strength attribute values are depicted at 241. Here, the password pattern service resolves the new password's strength attribute value in response to such things as a quality value, a usage of the past password patterns by the user, group password pattern statistics, and other attributes of the new password being offered by the user. The quality value can be calculated based on predefined characteristics of the new password pattern being offered with the new password. Some such characteristics may include character variation, usage of different character sets, etc. The usage of past password patterns takes into account the personal password pattern history associated with the user offering the new password. The group password pattern statistics takes into account a number of users currently using the new password pattern being offered by the user with the new password (too many users with the same or similar password pattern is discouraged by the password pattern service). The attributes can include such things as the length of the password, the cost to process or compute a hash for the password, a hardware or software strength factor for the password, etc.

According to an embodiment, at 242, the password pattern service dynamically and in real time downgrades the strength attribute associated with the password pattern for the new password when that pattern represents a particular pattern that the user has repeated and used before. Here, the password pattern service can also suggest a particular password pattern to the user that is identified as having a particularly desirable strength value that is greater than a predefined threshold strength value. So, the user can be interactively guided by the password pattern service toward an acceptable password pattern. In this manner, the user is forced to regularly change password patterns and cannot repeat any particular pattern. Although this approach may be annoying to the user it is a secure approach that would ensure discovering the user's password by an intruder is highly unlikely.

At 250, the password pattern service determines in real time whether the new password is to be accepted or denied in response to comparing the strength attribute value associated and dynamically assigned to the new password and its pattern against a predefined threshold strength value. Again, each time a new password is offered an analysis is done as described above to dynamically and real time assess whether at that particular point in time a particular password and its pattern is acceptable for access to an enterprise's secure network.

In an embodiment, at 251, the password pattern service accepts the new pattern associated with the new password but also advises the user that the strength attribute for the new pattern is close to being unacceptable to the password pattern service. This is done by comparing another threshold strength value to the strength value assigned to the new pattern and resolving what is considered close enough to advise the user when the difference falls within a range of values. So, if the original threshold value is 10 and a user has a value of 11 then the difference between the two is 1 and when that is compared to another threshold range value say 5 it is determined that the user should consider at least being at a strength value of 15 and the user is advised to consider changing to a pattern having a strength value of 15, the specific pattern can even be interactively suggested to the user.

In another case, at 251, the password pattern service denies the password pattern offered by the user via the new password and does dynamically and interactively suggest an acceptable password pattern for the user to correct the problem and to gain acceptance.

In still another situation, at 260, the password pattern service dynamically and in real time modifies an existing password policy to exclude the password pattern when the pattern is denied for the new password offered by the user. So, when a pattern is rejected that pattern can be specifically flagged in the password policy so it is excluded in the future by the user or other users that attempt to use it. In this manner, the password pattern service implements dynamic and adaptive password policy enforcement.

Figure 3:
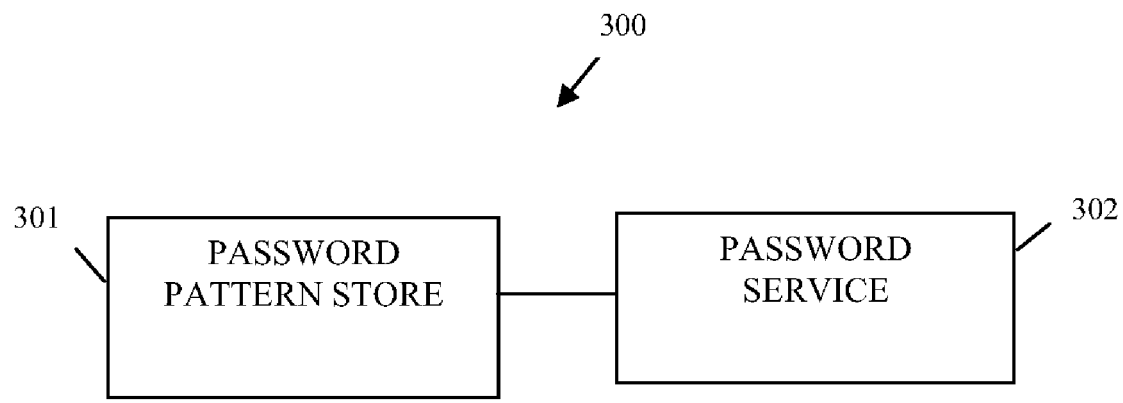
FIG. 3 is a diagram of an adaptive password policy system, according to an example embodiment.

FIG. 3 is a diagram of an adaptive password policy system 300, according to an example embodiment. The adaptive password policy system 300 is implemented as instructions on or within a machine-accessible and readable medium. The instructions when executed by a machine perform processing depicted with respect to the method 100 of the FIG. 1 and the method 200 of the FIG. 2. The adaptive password policy system 300 is also operational over a network and the network may be wired, wireless, or a combination of wired and wireless. In some cases the network is the Internet or a wide-area network (WAN).

The adaptive password policy system 300 includes a password pattern store 301 and a password service 302. Each of these will now be discussed in turn.

The password pattern store 301 is implemented in a machine-accessible and computer-readable medium and is accessible to the password service that processes on a machine (computer, processing device, etc.).

Each entry in the password pattern store 301 can include a variety of useful information. For example, each entry can include a particular unique password pattern, particular user identifications for users that are currently or have used that particular password pattern, a particular group identification associated with a grouping of users that are currently or have used the particular pattern, a frequency of use number that identifies a total number of active users or active groups that are using the particular pattern, and a particular strength attribute value that is dynamically altered and changed as conditions change within the password pattern store. The password service 302 makes the dynamic alterations or changes to the particular strength attribute value.

The password pattern store 301 need not store the particular passwords for particular users; rather hash values can be stored and the patterns being generically used can be stored. As users supply passwords, the patterns are checked and a hash algorithm processed to acquire an expected hash value. So, the actual content of a password need not be retained. This improves security.

Additionally, in some embodiments, the password pattern store 301 can encrypt the password pattern entries for added security. Extra authentication may be required to access the entries or to update the entries and the requesting service may have to possess a proper decryption algorithm to utilize the contents of the entries.

The password service 302 is implemented in a machine-accessible and computer-readable medium and is to process on the machine. Example processing associated with the password service 302 was described in detail above with reference to the methods 100 and 200 of the FIGS. 1 and 2, respectively.

The password service 302 mines the password patterns from the password pattern store 301 to dynamically alter password strength attribute values with each particular password pattern. The password service 302 dynamically and in real time adapts a password policy in response to the changing password strength attribute values for the password patterns. So, as the strength attribute values change so does the password policy; this policy is then evolving to meet the chaotic changes in the enterprise environment.

According to an embodiment, the password service 302 mines the password pattern store 301 to assemble and acquire a personal password history for a particular user that identifies each pattern for each password that the particular user has used before. This provides a complete history of password usage for the user and permits the password service 302 to prevent, if desired or configured, any attempt by the user to repeat a password having a prior used pattern. In some cases, a limited number of repeat pattern usage may be permitted. Again, what is and is not permissible can be part of the password policy enforced by the password service 302. Also, in some cases the password service 302 resolves a particular password strength attribute for the particular user in response to the personal password history and a new proposed password offered by the particular user.

In an embodiment, the password service 302 resolves a particular password strength attribute for a particular user in response to a group password history that is also mined from the password pattern store 301. The password strength attribute is resolved in response to a new proposed password offered by the particular user. Also, the user is associated with a group for which the group password history belongs.

According to an embodiment, the password service 302 actively advises the users when the password strength attribute values are unacceptable by providing acceptable password patterns for the users to conform their passwords to. So, the password service 302 can actively and in an automated fashion advise users that their chosen pattern is unacceptable and provide alternative patterns for the user to re-attempt.

The password pattern store 301 may include a search interface that permits the password service 302 to actively query, update, and manipulate entries in the password service 302. In an embodiment, the password service 302 is a relational database. In another embodiment, the password service 302 is a directory of files. It is understood that the password service 302 can be organized in a variety of manners and some may include combinations of files, databases, tables, etc.

Figure 4:
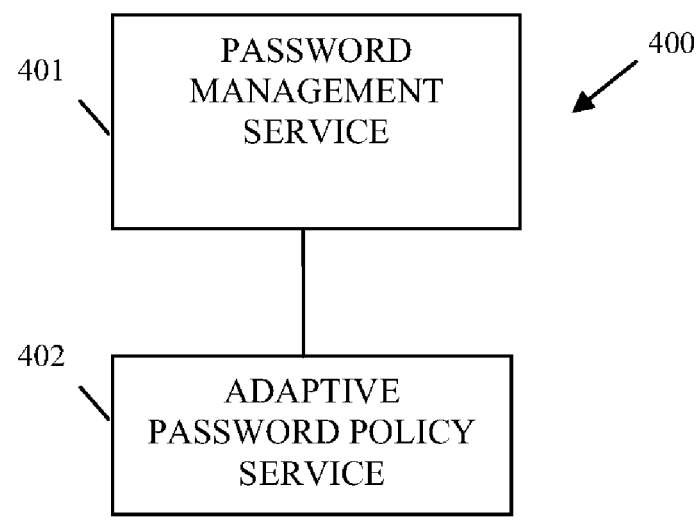
FIG. 4 is a diagram of another adaptive password policy system, according to an example embodiment.

FIG. 4 is a diagram of another adaptive password policy system 400, according to an example embodiment. The adaptive password policy system 400 is implemented as instructions on or within a machine-accessible and readable medium. The instructions when executed by one or more machines also perform, among other things; the processing depicted with respect to the method 100 of the FIG. 1 and the method 200 of the FIG. 2. The adaptive password policy system 400 is also operational over a network and the network may be wired, wireless, or a combination of wired and wireless.

The adaptive password policy system 400 includes a password management service 401 and an adaptive password policy service 402. Each of these will now be discussed in turn.

The password management service 401 is implemented in machine-accessible and readable medium and is to process on a machine (computer, processing device, etc.).

The password management service 401 interacts with a user to receive a new password from the user when the user is newly registered or when the user is changing from an existing password to the new password. The password management service 401 interacts with the adaptive password policy service 402 to receive an indication as to whether the new password is permissible.

The adaptive password policy service 402 is implemented in a machine-accessible and computer-readable medium and is to process on the same machine as the password management service 401 or an entirely different machine from that which is associated with the password management service 401. Example processing associated with the adaptive password policy service 402 was described in detail above with reference to the methods 100 and 200 of the FIGS. 1 and 2, respectively.

The adaptive password policy service 402 dynamically alters an existing policy in response to mining a history of passwords for the user and the new password and informs the password management service 401 to reject the new password in response to the modified existing policy.

According to an embodiment, the adaptive password policy service 402 derives a pattern for the new password and compares that pattern against unique patterns associated with the history of passwords. This is done to calculate and then assign a strength value to the new password.

In an embodiment, the adaptive password policy service 402 determines to reject the new password when the strength value falls below a predefined threshold value.

In still other embodiments, the adaptive password policy service 402 alters other strength values for the history of passwords in response to the pattern for the new password. So, the adaptive password policy service 402 regularly and continually changes the strength values for password patterns as conditions change within the enterprise environment with respect to password usage.

It is now appreciated how password patterns can be used dynamically evaluated and analyzed along with other configured factors to automatically assign and calculate password strengths and adjust or adapt password policies. This is all done in an automated and real time fashion and without manual intervention from an administrator.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method residing and implemented in a non-transitory machine-readable medium for executing on a machine, comprising:
   integrating, by the machine, processing of the method as a supplemental service to an enterprise authentication service that is just invoked by the authentication service when newly presented passwords are being established by the authentication service;
   enforcing, by the machine, a first password policy against users of a network service;
   dynamically evaluating, by the machine, password patterns being used by the users; and
   adapting, by the machine, in real-time to a second password policy in response to evaluation of the password patterns and enforcing the second password policy in place of the first password policy against the users, the first password policy is dynamically altered to adapt to the second password policy and the second password policy evolves based on changing patterns for used passwords, the used passwords stored as regular expressions that define the password patterns without retaining the used passwords, and the first password policy counts a total number of decorations or modifications made to each base pattern identified in the regular expressions and when a predefined threshold of iterative modifications on that base pattern is detected, the second password policy is dynamically enforced without administrative intervention or analysis.

2. The method of claim 1, wherein dynamically evaluating further includes detecting a particular base pattern being modified by a variety of the users, wherein the total number of decorations or modifications to the particular base pattern exceeds the predefined threshold.

3. The method of claim 2, wherein adapting further includes identifying that the first password policy permits the particular base pattern and modifying the first password policy to deny subsequent usage of the particular base pattern by the users for subsequent passwords and making the second password policy the modified first password policy that excludes usage of the particular base pattern.

4. The method of claim 1, wherein dynamically evaluating further includes dynamically mining a password database to identify regular expressions in use within the password database for passwords.

5. The method of claim 4, wherein dynamically mining further includes categorizing the regular expressions into groupings, each group associated with a particular user, a particular grouping of users, or the users as a whole.

6. The method of claim 5 further comprising:
   assigning, by the machine, frequency numbers to each grouping for each regular expression; and
   adjusting, by the machine, a strength attribute for each password associated with each regular expression in response to that regular expression's associated frequency number.

7. The method of claim 6 further comprising:
   migrating, by the machine, to the second password policy in response to a threshold strength value when compared to the strength attributes for the regular expressions;
   denying, by the machine, a new password received as a modification password from one of the users or received from a new user when the new password is associated with a particular strength attribute that falls below the threshold strength value.

8. A machine-implemented method residing and implemented in a non-transitory machine-readable medium for executing on a machine, comprising:
   integrating, by the machine, processing of the method as a supplemental service to an enterprise authentication service that is just invoked by the authentication service when newly presented passwords are being established by the authentication service;
   prompting, by the machine, a user to change an existing password;
   receiving, by the machine, a new password from the user;
   analyzing, by the machine, past password patterns used by the user in view of a new pattern associated with the new password by at least detecting a total number of modifications made to each unique previous pattern and detecting when a predefined threshold of iterative modifications is reached, the past password patterns and the previous patterns retained as regular expressions and the existing password not retained;
   dynamically adjusting, by the machine, password strength attributes for the past password patterns and the new pattern in response to a frequency of use for each past password pattern and the new pattern in view of the predefined threshold and without administrative intervention or analysis; and
   determining, by the machine, in real time whether the new password is to be accepted or denied in response to comparing the strength attribute associated with the new pattern against a threshold strength value.

9. The method of claim 8, wherein analyzing further includes, analyzing other password patterns used by a group of users to which the user is assigned and including the other password patterns when adjusting the password strength attributes.

10. The method of claim 8 further comprising, dynamically, by the machine, and in real time modifying an existing password policy to exclude the new pattern when the new pattern is denied.

11. The method of claim 8, wherein dynamically adjusting further includes resolving the new password's strength attribute in response to:
   a quality value for the new pattern as determined by characteristics of the new pattern defined in a quality policy;
   usage of the past password patterns by the user;
   group password pattern statistics that accounts for a number of users currently using the new pattern for the new password; and
   attributes of the new password including a length of the new password, variation in characters used in the new password, and variation in casing for the characters.

12. The method of claim 8, wherein determining further includes, accepting the new pattern but advising the user that the strength attribute is close to being unacceptable when compared to the threshold strength value, wherein what is close is determined using another threshold representing a range of values for the difference between the strength attribute and the threshold strength value.

13. The method of claim 8, wherein determining further includes, denying the new pattern and suggesting a particular password pattern to the user that is identified as having a particular strength value that is greater than the threshold strength value.

14. The method of claim 8, wherein dynamically adjusting further includes downgrading the strength attribute associated with the new pattern when the new pattern represents a particular pattern that the user has repeated and used before, and wherein policy dictates whether the downgrading forces the strength attribute for the new pattern to fall below the threshold strength value or whether the strength attribute for the new pattern remains above the threshold strength value.

15. A system comprising:
- a processing device configured for accessing a password pattern store residing in a non-transitory machine-accessible and computer-readable medium and accessible to a password service that executes on the processing device;
- the processing device further configured with the password service implemented in a non-transitory machine-accessible and computer-readable medium and the password service executes on the processing device;
- wherein the password service stores password patterns as regular expressions received from users in the password pattern store without storing particular passwords and the password service mines the password patterns to dynamically alter password strength attribute values associated with each particular password pattern, and wherein the password service dynamically and in real time alters, evolves, and adapts a password policy in response to changing password strength attribute values for the password patterns being used without administrative intervention or analysis based on counting a total number of modifications made to each base pattern identified in the regular expressions and detecting when a predefined threshold of iterative modifications on that base pattern is reached; the password service integrated as a supplemental service to an enterprise authentication service that is just invoked by the authentication service when newly presented passwords are being established by the authentication service.

16. The system of claim 15, wherein each entry within the password pattern store includes a particular pattern, particular user identifications for users that are currently or have used the particular pattern, a particular group identification associated with a grouping of users that are currently or have used the particular pattern, a frequency of use number identifying a total number of active users or active groups that are using the particular pattern, and a particular strength attribute value that is dynamically altered and changed as conditions change within the password pattern store, wherein the password service makes the dynamic alternations or changes to the particular strength attribute value.

17. The system of claim 15, wherein the password service mines the password pattern store to acquire a personal password history for a particular user that identifies each pattern for each password that the particular user has used.

18. The system of claim 17, wherein the password service resolves a particular password strength attribute for the particular user in response to the personal password history and a new proposed password offered by the particular user.

19. The system of claim 15, wherein the password service resolves a particular password strength attribute for a particular user in response to a group password history mined from the password pattern store in response to a new proposed password offered by the particular user, wherein the particular user is associated with a group to which the group password history belongs to.

20. The system of claim 15, wherein the password service actively advises the users when the password strength attribute values are unacceptable by providing acceptable password patterns for the users to conform their passwords to.

21. A system, comprising:
- a processing device configured with a password management service implemented in a non-transitory machine-accessible and computer-readable medium and the password management service executes on the processing device; and
- the processing device or a different processing device from the processing device further configured with an adaptive password policy service implemented in a non-transitory machine-accessible and computer-readable medium and the adaptive password policy service executes on the processing device or the different processing device;
- wherein the password management service interacts with a user to receive a new password from the user when the user is newly registered or when the user is changing from an existing password to the new password, and wherein the password management service interacts with the adaptive password policy service to receive an indication as to whether the new password is permissible, and wherein the adaptive password policy service dynamically alters an existing policy in response to mining a history of passwords for the user and the new password and informs the password management service to reject the new password in response to the dynamically altered and modified existing policy and the dynamically altered and modified existing policy is evolved by the adaptive password policy based on changing patterns for used passwords without administrative intervention or analysis by counting a total number of modifications made to each base pattern identified in the history of passwords that are stored as regular expressions and by detecting when a predefined threshold of iterative modifications on that base pattern is reached, history passwords in the history of passwords are not retained, rather, the regular expressions are retained in the history of passwords, and wherein the adaptive password management service is integrated as a supplemental service to an enterprise authentication service that is just invoked by the authentication service when newly presented passwords are being established by the authentication service.

22. The system of claim 21, wherein the adaptive password policy service derives a pattern for the new password and compares that pattern against unique patterns associated with the history of passwords to assign a strength value to the new password.

23. The system of claim 22, wherein the adaptive password policy service determines to reject the new password when the strength value falls below a threshold value.

24. The system of claim 23, wherein the adaptive password policy service alters other strength values for the history of passwords in response to the pattern for the new password.

* * * * *